United States Patent

Spintzyk

[19]

[11] Patent Number: 5,884,742
[45] Date of Patent: Mar. 23, 1999

[54] METHOD FOR COOLING THE OPERATING MEDIUM IN DRIVE UNITS FOR CONVERTER SYSTEMS, NOTABLY CHAIN CONVEYER SYSTEMS AND DRIVE UNIT

[75] Inventor: Eugen Spintzyk, Crailsheim, Germany

[73] Assignee: Voith Turbo GmbH & Co., KG, Heidenheim, Germany

[21] Appl. No.: 790,121

[22] Filed: Jan. 29, 1997

[30] Foreign Application Priority Data

Jan. 29, 1996 [DE] Germany ............... 196 03 148.6

[51] Int. Cl.⁶ .................................................. B65G 23/26
[52] U.S. Cl. .................................. 192/113.1; 60/337
[58] Field of Search .............. 60/337, 912; 198/952; 192/113.1, 58.2

[56] References Cited

U.S. PATENT DOCUMENTS

| | | | |
|---|---|---|---|
| 2,459,734 | 1/1949 | McCracken | 60/329 |
| 3,063,245 | 11/1962 | Rippy | 60/337 X |
| 3,716,995 | 2/1973 | Peter et al. | 60/912 X |
| 4,440,272 | 4/1984 | Bieber | 60/337 X |
| 4,662,175 | 5/1987 | Wahl et al. | 60/337 |

FOREIGN PATENT DOCUMENTS

| | | |
|---|---|---|
| 909 272 | 4/1954 | Germany . |
| 33 18 462 | 11/1984 | Germany . |
| 41 22 0032 | 8/1992 | Germany . |
| 2 257 102 | 1/1993 | United Kingdom . |

OTHER PUBLICATIONS

Hans A. Ruffing, Antriedstechnik, p. 352, pp. 354–355, Aug. 1991.

*Primary Examiner*—Rodney H. Bonck
*Attorney, Agent, or Firm*—Randall J. Knuth

[57] ABSTRACT

The invention relates to a method for operating a drive unit for a conveyor system, in particular for a chain conveyor drive with at least one driving machine and at least one hydrodynamic clutch. The hydrodynamic clutch can be filled with operating medium in which, during continuous operation, the operating medium is guided in a closed circuit. The circuit includes an inlet line associated such that the operating medium losses in the circuit are compensated for and in which the temperature in the closed circuit is ascertained and compared with a permissible temperature value. The invention includes the feature that upon exceeding an permissible temperature value in the closed circuit, the inlet line and the outlet line are simultaneously connected in the circuit for the purpose of volumetric cooling.

7 Claims, 1 Drawing Sheet

METHOD FOR COOLING THE OPERATING MEDIUM IN DRIVE UNITS FOR CONVERTER SYSTEMS, NOTABLY CHAIN CONVEYER SYSTEMS AND DRIVE UNIT

BACKGROUND OF THE INVENTION

1. Field of the Invention

The invention relates to a method for cooling the operating medium in a drive unit for conveyor system, in particular chain Conveyor Systems. Furthermore, the invention is applicable to a drive unit of a conveyor system, in particular a belt drive system.

2. Description of the Related Art

It is known in conveyor systems, in particular in chain conveyor systems, for achieving a slow, pressure-free acceleration of the system, damping of load surges and for load equalization, to use drive units with a hydrodynamic clutch. Thus, above all, a power transmission free from wear, a balanced starting-up of the motor and a gentle acceleration of the heaviest masses should be achieved. Particularly when used in mining, it is customary to operate these clutches with the operating medium water. To achieve the dissipation of heat during continuous operation, these clutches and the operating medium circuit are designed so that operating medium is discharged constantly from the working circuit of the clutch and thus the heat produced during the power transmission is dissipated. Two systems are generally used 1. an open system; and
2. a closed system.

When using an open system, the clutches are supplied from a fresh water pipe. When using a double clutch, i.e., a clutch with two circuits, the water control arrangement contains two water circuits—also referred to as working circuits. At start-up, the latter are filled with a large volumetric flow, whereas in continuous operation there is a switch to a reduced volumetric flow in the system. The latter serves for dissipating the heat produced at the time of power transmission.

On account of the continuous throughflow of operating medium, i.e., the continuous uniform supply and discharge of fresh water into and out of the working chamber, the entire system is simple and has a very small construction. A separate cooler for the dissipation of the occurring slip heat from the operating liquid is not necessary. However, the high water consumption is a drawback, since fresh water must be prepared continuously for passage through the clutch. The preparation may be problematic depending on the application.

A second known possibility consists of conveying the operating medium in a closed system with an integrated cooling device. For this purpose, the clutches are supplied from a tank by way of connecting lines in the form of hoses. The tank is located below the level of the clutches. The operating fluid from the clutch, in particular the working chamber, can thus flow back into the tank due to gravity. However, for operation, a pump is required, which conveys the operating medium located in the tank into the working circuit of the clutch. On account of the power transmission by the operating medium, the latter heats up. Spray nozzles are therefore provided on the outer periphery of the clutch, by way of which a gradual escape of the operating medium takes place. The discharged, heated, operating medium collects in the operating medium collecting or clutch housing and from there returns to the tank due to gravity.

A closed system of this type is characterized in particular by a water-saving method of operation, however, an increased number of components and elements also has an increased space requirement, in particular on account of the necessity of providing feed lines between the tank and clutch and on account of the difference in height between the working chamber and the tank necessary in order to achieve the return flow.

SUMMARY OF THE INVENTION

According to the invention, an operating medium supply system is associated with a hydrodynamic clutch able to be connected at least indirectly to the drive machine, in which, during continuous operation, the operating medium circulates in a closed circuit. At least one inlet pipe and one outlet pipe are associated with the circuit. According to the requirements, these inlet and outlet pipes may be connected either separately or jointly. The connection of the outlet pipe takes place in this case:

1. solely at the time when the driving machine is set in operation and there is thus a related requirement of removal of the residual filling from the working chamber of the hydrodynamic clutch; andor
2. in the case of a common connection of the inlet pipe for the purpose of volumetric cooling.

It is therefore the object of the invention to simplify a method for cooling the operating medium during continuous operation so that the said drawbacks are obviated. Furthermore, the hydrodynamic clutch is to be integrated in a drive system for conveyor systems, in particular for chain conveyors and its operating medium supply during the individual operating phases is to be designed so that the drawbacks of known solutions are obviated and the expenditure for the control system can be substantially minimized. Particularly in the case of a chain conveyor, a more balanced starting-up of the motor should be achieved. In clutches conventionally used hitherto, this proves problematic, since the diameters of the nozzles, i.e. the bores dispensing a quantity which can be regulated, by which the working or operating fluid passes from the working chamber for example into the feed chamber, are very small on account of the generally very high water consumption in conventional solutions, for which reason, for the residual filling, a very rapid removal from the clutch rotor must take place. In particular, also the entire filling system should have a substantially smaller construction with a simultaneous increase in the thermal capacity, the adjustment speed of the clutch should be increased and functions of crawling travel and of tensioning the chain should be substantially improved.

For the purpose of connecting the discharge pipe, a control valve is provided in the circuit, which valve may be constructed for example as a 3/2-way valve. In a first switching Position I of the 3/2-way valve, the connection between the discharge pipe and outlet of the hydrodynamic clutch takes place. This switching position is used for removing the residual filling and for volumetric cooling. The switching position II, which blocks the outlet of the hydrodynamic clutch, serves for filling the working chamber. A third switching position III, which is adopted during continuous operation allows the circulation of the operating medium between the outlet and inlet of the hydrodynamic clutch.

If an increased temperature is measured in the circuit at the outlet, the control valve—the 3/2-way valve—is brought into the first switching position and at the same time corresponding to the pressure drop in the liquid, which is likewise ascertained in the circuit, the inlet pipe is connected to the circuit. The operating fluid which has flown out is replaced by new operating fluid. On reaching the corresponding temperature in the outlet of the clutch and a satisfactorily high pressure in the working circuit, the outlet and inlet pipe are closed. This operation must not take place simultaneously, it may also proceed in succession, however on account of the requirement of a certain operating medium pressure, the disconnection of the outlet pipe taking place first.

The change as regards apparatus takes place in such a way that associated with the hydrodynamic clutch is a circuit to which an outlet and an inlet pipe can be connected. During continuous operation, the circuit connects the outlet of the clutch to the inlet of the hydrodynamic clutch. For this purpose, in the throughflow direction, the outlet of the hydrodynamic clutch is followed by a control valve, for example in the form of a 3/2-way valve. In a first switching position I, this facilitates the connection of the clutch outlet to the outlet pipe, in a second switching position II the shutting-off of the outlet of the hydrodynamic clutch, so that filling may take place, and in the third switching Position III the connection between the clutch outlet and clutch inlet and thus the operating medium circulation in a closed circuit. Also provided in the outlet of the hydrodynamic clutch is a measuring device, which at least indirectly ascertains the temperature of the operating medium, which passes for example by way of spray nozzles from the working chamber of the hydrodynamic clutch into the housing or into a discharge shell.

The operating medium collected in the discharge shell or clutch housing is once again supplied by means of a pump device to the working chamber. The pump device thus ensures the circulation in the closed circuit. On exceeding a certain permissible temperature value of the operating medium, the adjusting device of the control valve, i.e, of the 3/2-way valve is actuated and the latter is brought into the switching position I. The overheated operating medium is then discharged from the clutch by way of the 3/2-way valve. This operating medium can then be collected in a tank. Since with the discharge of the operating medium by way of the outlet pipe, the pressure in the circuit, which is associated with the hydrodynamic clutch, drops, the operating medium removed is replaced by new, generally clear water. For this purpose, associated with the clutch circuit is a diaphragm, which is preceded by a pressure-measuring device for ascertaining the diaphragm pressure. This pressure-measuring device ascertains the pressure in the operating medium stream supplied to the clutch. At the time of the discharge or removal of the overheated operating medium, the circuit associated with the clutch is interrupted. An exchange of the operating medium takes place solely on account of the connection of the clutch outlet to the outlet pipe and of the clutch inlet to a supply pipe.

The solution according to the invention allows load-free starting of the drive motor as well as gentle, jerk-free engagement of the clutch. Associated with the clutch is solely an operating circuit closed during continuous operation, which can be opened for filling and emptying so that solely an in-take and/or discharge of the operating medium into or out of the clutch working chamber takes place.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
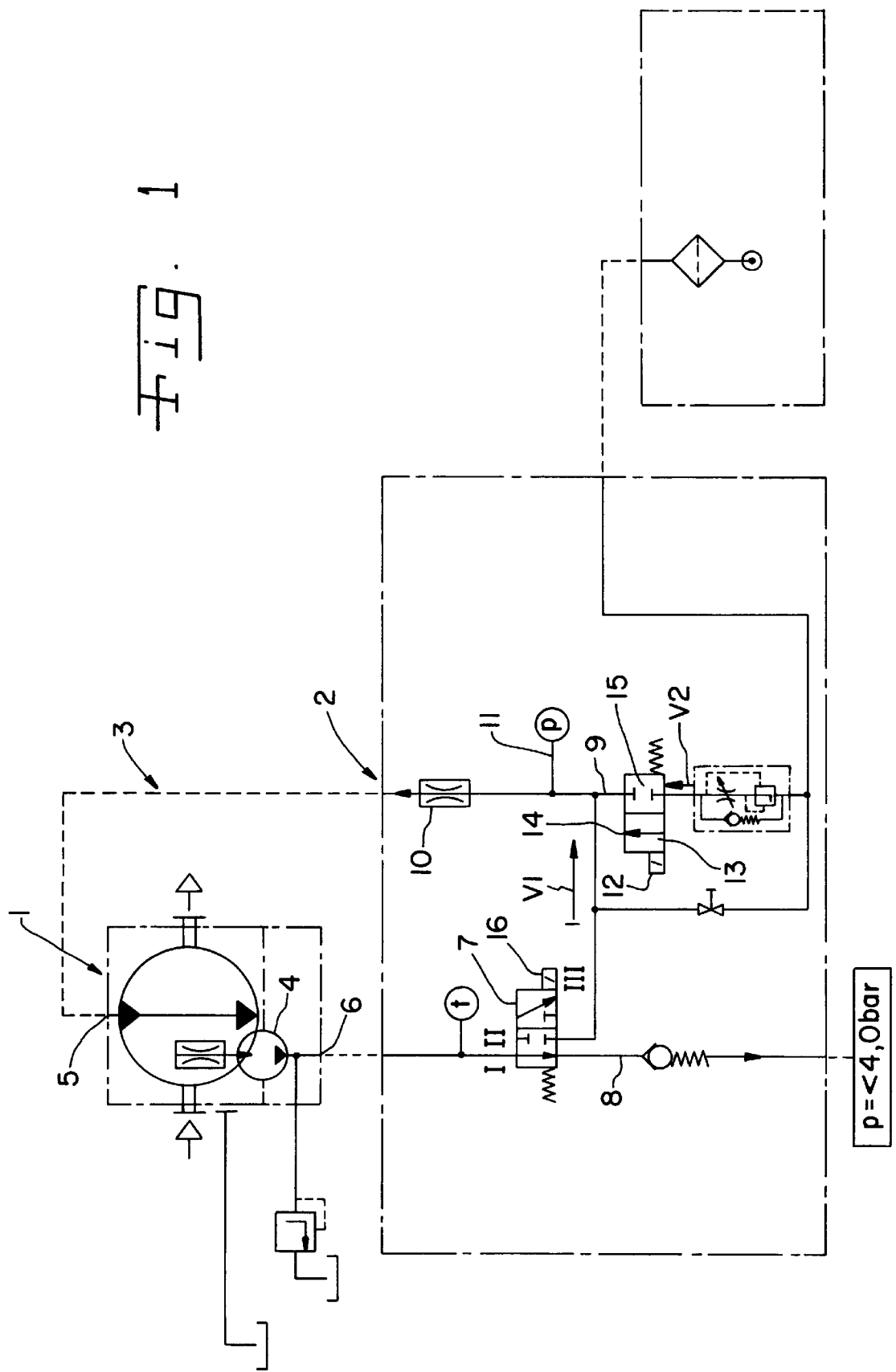
FIG. 1 is a diagrammatic view of the present invention.

FIG. 1 shows, diagrammatically, an operating medium supply system of a turbo clutch designed according to the invention, comprising a closed circuit for the circulation of operating medium, in particular for use in chain conveyor systems in mining. In this case, water is preferably used as the operating fluid.

An operating medium supply system 2 is associated with a hydrodynamic clutch 1 used in a drive system for a conveyor system, for example for driving a chain conveyor. This system 2 comprises a circuit 3 closed during operation of the drive unit and thus during operation of the hydrodynamic clutch.

The circuit 3 comprises a tank preferably integrated in the housing (not shown in this case) of the clutch 1, which can be constructed for example as an overhead tank or, however, as a container located below the clutch working circuit, as well as a pressure pump 4. Associated with the working chamber of the clutch 1 are at least one inlet 5 and one outlet 6, which are components of the circuit 3 closed during continuous operation. In the outlet 6, a control valve 7 follows the pressure pump 4 in the circuit 3. This valve is constructed as a 3/2-way valve.

By means of the multi-way valve, it is possible to allow the operating medium to circulate in the circuit 3 during continuous operation and at the time of the emptying operation, to allow rapid emptying of the clutch.

An outlet line 6 for the emptying operation and an inlet line 9 for compensating for leakage losses in the circuit 3 are associated with the circuit 3 during continuous operation. The outlet line 6 is connected by means of the multi-way valve 7 to the circuit 3 for the purpose of emptying the working chamber for example into a tank during the switching-an of the drive motor. For this purpose, the 3/2-way valve 7 is brought into a first switching Position I. In this Switching Position I, the operating medium in the circuit 3 flows solely from the working chamber of the clutch into a tank integrated for example in the housing. When the tank is located at a level below the working chamber, emptying may take place solely due to gravity. When located at a level equal to or higher than that of the working chamber, emptying takes place with the assistance of the pressure pump 4. In order to keep the emptying time of the clutch working chamber generally as short as possible, the residual filling is pumped by means of the pressure pump 4 into the tank. Filling then takes place again from the tank into the working chamber. When the tank is located at a level higher than that of the working chamber, filling takes place solely on account of gravity and does not need to be assisted by additional pumping devices.

If the clutch working chamber is empty, then the starting-up operation may begin. For filling the clutch working chamber, the 3/2-way valve 7 is brought into switching position II, then, during continuous operation, into switching position III. In switching position III, the operating medium circulates in the circuit 3, which is then closed and thus operates as a closed circuit. The circulating operating medium volumetric flow is forced through a diaphragm 10 located in the circuit 3. Preceding the diaphragm 10 is a pressure-measuring device 11 for example in the form of a pressure receiver, which measures the pressure in the circuit 3 and by means of which, at the time of a pressure drop in the system, i.e., at the time of leakage losses, a device for releasing or supplying a corresponding operating medium volumetric flow into the circuit 3 can be actuated. For this purpose, for example a signal from the pressure-measuring device 11 is converted at an adjusting device 12, which is active on a 2-way valve 13, by means of which the fresh water supply to the circuit 3 can be controlled by means of the inlet line 9. On falling below a necessary pressure value in the circuit 3, the 2-way valve 13 is brought into a first switching position 14. The two operating medium volumetric flows, a first volumetric flow V1 from the closed circuit 3 and a second volumetric flow V2 supplied by way of the inlet line 9, are then combined and supplied jointly to the working chamber of the clutch by way of the circuit 3. The supply, by way of the supply line 9, takes place until the necessary pressure value has been re-established in the circuit 3. The 2-way valve 13 is then brought into a switching position 15. In the latter, the inlet by way of the line 9 to the circuit 3 is blocked.

In the outlet of the dynamic pressure pump, a thermostat (not shown in detail) is installed, which ascertains the temperature of the operating medium. The outlet and the inlet are then connected in a temperature-dependent manner. On exceeding a predetermined temperature value in the circuit 3 or in the outlet 6 of the working chamber in the operating medium, an adjusting member 16 of the 3/2-way valve 7 is actuated, which brings the 3/2-way valve 7 into the switching position I.

The hydrodynamic clutch 1 is constructed so that during operation, by way of nozzle-like apertures, the operating medium is sprayed from the working chamber into the clutch housing or other collecting devices, for example feed shells. Generally, in conventional solutions, the sprayed operating medium is guided by way of a cooling device, for example in the form of a heat exchanger, and once again supplied to the working chamber. In the solution according to the invention, it is possible to dispense with a cooling device, since the sprayed operating medium flows from the clutch housing or the feed shell by means of the multi-way valve 7 in switching position I directly into the outlet line 8. The difference between the operating medium required in the working chamber and the discharged operating medium is supplemented by way of the inlet line 9 in the circuit 3. In this case, the outlet 8 may open for example into a tank, from which the inlet line 9 is once again supplied. A cooling device for example may be provided in the latter. However, it is advantageous that this tank can be used for several clutch units, as they are used in mining. Separate cooling devices for each clutch may therefore be dispensed with. However, the possibility also exists of removing operating medium from the clutch solely for cooling purposes and supplying fresh water.

A further possibility consists, in the circuit 3, but which is not shown here, of installing a cooler, which as the cooling medium carries motor cooling water. Due to this, it is possible to reduce the water consumption at the time of nominal operation to zero, since solely leakage losses occur.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for operating a drive unit for a conveyor system having at least one driving machine with at least one hydrodynamic clutch, the method comprising the steps of:

filling the hydrodynamic clutch operating medium;

guiding the operating medium in a closed circuit when the driving machine is in continuous operation;

providing an inlet line associated with the circuit, by which operating medium losses in the circuit are compensated for;

determining a value characterizing the temperature in the closed circuit;

comparing the value with a given admissible temperature value; and connecting the inlet line and an output line to the closed circuit for volumetric cooling when the admissible temperature value in the closed circuit is exceeded.

2. The method of claim 1 in which the connecting step includes simultaneously creating the connection of the inlet line and output line to the closed circuit.

3. The method for operating a drive unit for a conveyor system according to claim 1, wherein said step of connecting said inlet line and said output line to the closed circuit is done in succession.

4. A drive unit for a conveyor system, said drive unit comprising:

at least one driving machine having at least one hydrodynamic clutch including a working chamber able to be filled with an operating medium;

said hydrodynamic clutch connectable to the conveyor system;

an operating medium supply system associated with the hydrodynamic clutch, said operating medium supply system including at least one closed circuit for circulating the operating medium therethrough during operation;

at least one inlet line and one outlet line connectable one of separately and jointly to the operating medium supply system;

at least one valve having at least three switching positions associated with the operating medium supply system, a first said switching position for circulating the operating medium through the outlet line, a second said switching position for preventing the operating medium from circulating therethrough the operating medium supply system, and a third said switching position for creating said closed circuit;

at least one control valve having at least two control switching positions associated with the operating medium supply system, a first said control switching position for circulating the operating medium from the inlet line, and a said second control switching position for creating said closed circuit; and a pressure measuring device operatively associated with one of said valve and said control valve.

5. The drive unit for a conveyor system according to claim 4 wherein said valve is a multi-way valve.

6. The drive unit for a conveyor system according to claim 5 wherein said multi-way valve is a 3/2-way valve.

7. The drive unit for a conveyor system according to claim 4 wherein said control valve is a 2/2-way valve.

* * * * *